(12) United States Patent
Naidoo et al.

(10) Patent No.: US 10,877,466 B2
(45) Date of Patent: Dec. 29, 2020

(54) RECONCILIATION OF RUN-TIME AND CONFIGURATION DISCREPANCIES

(71) Applicant: FISHER-ROSEMOUNT SYSTEMS, INC., Round Rock, TX (US)

(72) Inventors: Julian K. Naidoo, Cedar Park, TX (US); Prashant Joshi, Leicester (GB); Daniel R. Strinden, Austin, TX (US); Cristopher Ian Sarmiento Uy, Metro Manila (PH)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 106 days.

(21) Appl. No.: 15/672,479

(22) Filed: Aug. 9, 2017

(65) Prior Publication Data

US 2019/0049928 A1   Feb. 14, 2019

(51) Int. Cl.
   *G05B 19/418*   (2006.01)
(52) U.S. Cl.
   CPC ............. *G05B 19/4184* (2013.01); *G05B 2219/35488* (2013.01); *G05B 2219/37591* (2013.01)
(58) Field of Classification Search
   None
   See application file for complete search history.

(56) References Cited

U.S. PATENT DOCUMENTS 9,804,589 B2 * 10/2017 Pettus ............ G05B 19/41845
2012/0250544 A1 * 10/2012 Sasaki ............ G05B 19/4184
                                                         370/252

(Continued)

FOREIGN PATENT DOCUMENTS

| GB | 2 351 806 A | 1/2001 |
| GB | 2 481 739 A | 1/2012 |
| WO | WO-2017/066308 A1 | 4/2017 |

OTHER PUBLICATIONS

Schneider Electric, "Core Configuration Guide—Display a List of Property Changes (Configuration Changes Auditing)", 2015, https://www.citect.schneider-electric.com/scada/clearscada/help/2015r2/Content/CoreConfigurationGuide/DisplayaListofPropertyChanges.htm, PP2 (Year: 2015).*

(Continued)

*Primary Examiner* — Mohammad Ali
*Assistant Examiner* — David Earl Ogg
(74) *Attorney, Agent, or Firm* — Marshall, Gerstein & Borun LLP

(57) ABSTRACT

Techniques for reconciling discrepancies between the runtime operation of a process plant and the configuration for the process plant allow for the process plant to be operated in a predictable and consistent manner. Additionally, techniques for reconciling discrepancies in the process plant enable inappropriate parameter values to be detected and reconciled efficiently and before such inappropriate values are included into configuration. Such techniques reduce the risk of downtime for online operation of the process plant to troubleshoot object configuration. A configuration engineer may provide one or more reconciliation instructions to reconcile the discrepancy. A configuration application then updates the process control environment of the process plant in accordance with the one or more reconciliation instructions. In some cases, the discrepancy is resolved by updating a configuration file for the object. In other cases, the discrepancy is resolved by updating the runtime instantiation of the object.

15 Claims, 4 Drawing Sheets

(56) References Cited

U.S. PATENT DOCUMENTS

| | | | |
|---|---|---|---|
| 2014/0025186 A1* | 1/2014 | Ojha | G05B 19/0426 |
| | | | 700/83 |
| 2016/0078163 A1* | 3/2016 | Koshimaki | G06F 17/5045 |
| | | | 716/139 |
| 2018/0150292 A1* | 5/2018 | Linn | G06F 8/71 |

OTHER PUBLICATIONS

Search Report for Application No. GB1812339.8, dated Dec. 6, 2018.

\* cited by examiner

RECONCILIATION OF RUN-TIME AND CONFIGURATION DISCREPANCIES

FIELD OF THE DISCLOSURE

The present invention relates generally to process plants and, more particularly, to reconciling discrepancies between the runtime settings and the configuration settings of a process plant or process control system.

BACKGROUND

Distributed control systems (DCS) are used in a variety of process industries including chemical, petrochemical, refining, pharmaceutical, food and beverage, power, cement, water and wastewater, oil and gas, pulp and paper, and steel, and are used to control batch, fed-batch, and continuous processes operating at a single site or at remote locations. Process plants typically include one or more process controllers communicatively coupled to one or more field devices via analog, digital or combined analog/digital buses, or via a wireless communication link or network. Collectively, the various devices perform monitoring, control, and data collection functions to control the process, safety shutdown systems, fire and gas detection systems, machine health monitoring systems, maintenance systems, decision support, and other systems.

The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration engineer to create or change operator interfaces which are used by a viewing application to display data to an operator and to enable the operator to change runtime settings, such as set points, events, and alarms, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Presently, configuration applications typically include a library of template objects or items, such as function block template objects and, in some cases, control module template objects. These configuration applications are used to configure a control strategy for a process plant and to provide display views at user interfaces of a process plant. The template objects all have default parameters, settings and methods associated therewith. The engineer using the configuration application can select these template objects and essentially place copies of the selected template objects into a configuration screen to develop a module, e.g., a control module. During the process of selecting and placing the template objects into the configuration screen, the engineer interconnects the inputs and outputs of these objects and changes their parameters, names, tags and other properties to create a specific control module for a specific use in the process plant. After creating one or more such control modules, the engineer may store the created module in the library or in a configuration data storage area. The engineer can then instantiate the control module (e.g., cause an executable file corresponding to the control module to be created) and download it to the appropriate controller or controllers, field devices, and other process elements for execution during operation of the process plant.

Thereafter, the engineer generally creates one or more displays for operators, maintenance personnel, etc. within the process plant by selecting and building display objects in a display creation application. These displays are typically implemented on a system wide basis in one or more of the workstations and provide preconfigured displays to the operator or maintenance persons regarding the operating state of the control system or the devices within the plant. Typically, these displays take the form of alarming displays that receive and display alarms generated by controllers or devices within the process plant, control displays indicating the operating state of the controllers and other devices being controlled within the process plant, maintenance displays indicating the functioning state of the devices within the process plant, etc. These displays are generally preconfigured to display, in known manners, information or data received from the process control modules, devices, or other process elements within the process plant. In some known systems, the displays enable the operator to modify runtime operation of the displayed objects from the preconfigured operation defined by the engineer. For example, the display may enable the operator to change an alarm limit such that the alarm for a particular process triggers less frequently.

Currently, when an operator makes a change to the runtime settings of one of the displayed objects (e.g., the operator changes one of the set points, alarm limits, priorities, interlocks, etc.), the change does not modify the configuration files for the displayed object. As a result, the runtime instantiation of the object has different values than the configuration files for the object. Thereafter, a control engineer may interact with the configuration application to make changes to this object and/or another object that is dependent on this object. When the configuration application attempts to update and download the corresponding configuration files, the configuration application does not know whether the updated configuration file should indicate the runtime value or the prior configuration value. This uncertainty causes the configuration application to present a warning or an error message to the control engineer.

SUMMARY

Users that monitor the operation of a process plant can modify various aspects of objects to suit their personal preferences. These changes modify the runtime instantiation of objects. Instantiation of objects results in a corresponding process element executing, during runtime, according to the internal items defined by the selected objects. For example, in the case of a control object, a user desires a particular modified configuration of the control object to be downloaded to a corresponding device in the runtime system. While the user modification impacts the runtime instantiation of the object, the underlying configuration for the object is unchanged.

A discrepancy reconciliation system in the process plant may detect these discrepancies and provide user controls to selectively reconcile the discrepancies. The term "reconcile" is used herein to refer to the act of ensuring that the same value for a particular process parameter is used in both the runtime instantiation of the object and the configuration of the object. In some scenarios, it is preferable to reconcile a discrepancy utilizing the original configuration value. In other scenarios, it is preferable to reconcile the discrepancy utilizing the value as modified by an operator. In any event, reconciling discrepancies maintains consistent and predictable operation of the process plant.

Further, when an engineer modifies the configuration of an object, the engineer may not modify each and every parameter of the object. If a discrepancy exists for a parameter that the engineer did not modify, the configuration application does not know whether engineer intended to include the previously configured value or the current runtime value for the parameter in the modified object. The configuration application can alert the engineer to this discrepancy and enable the engineer to reconcile the discrepancy before the value gets ported to future version of the object upon future version of the object. In this manner, any inappropriate changes made by an operator to an object parameter can be reconciled efficiently. Accordingly, the risk of downtime for online operation of the process plant caused by troubleshooting object configuration may be reduced.

DETAILED DESCRIPTION

Figure 1:
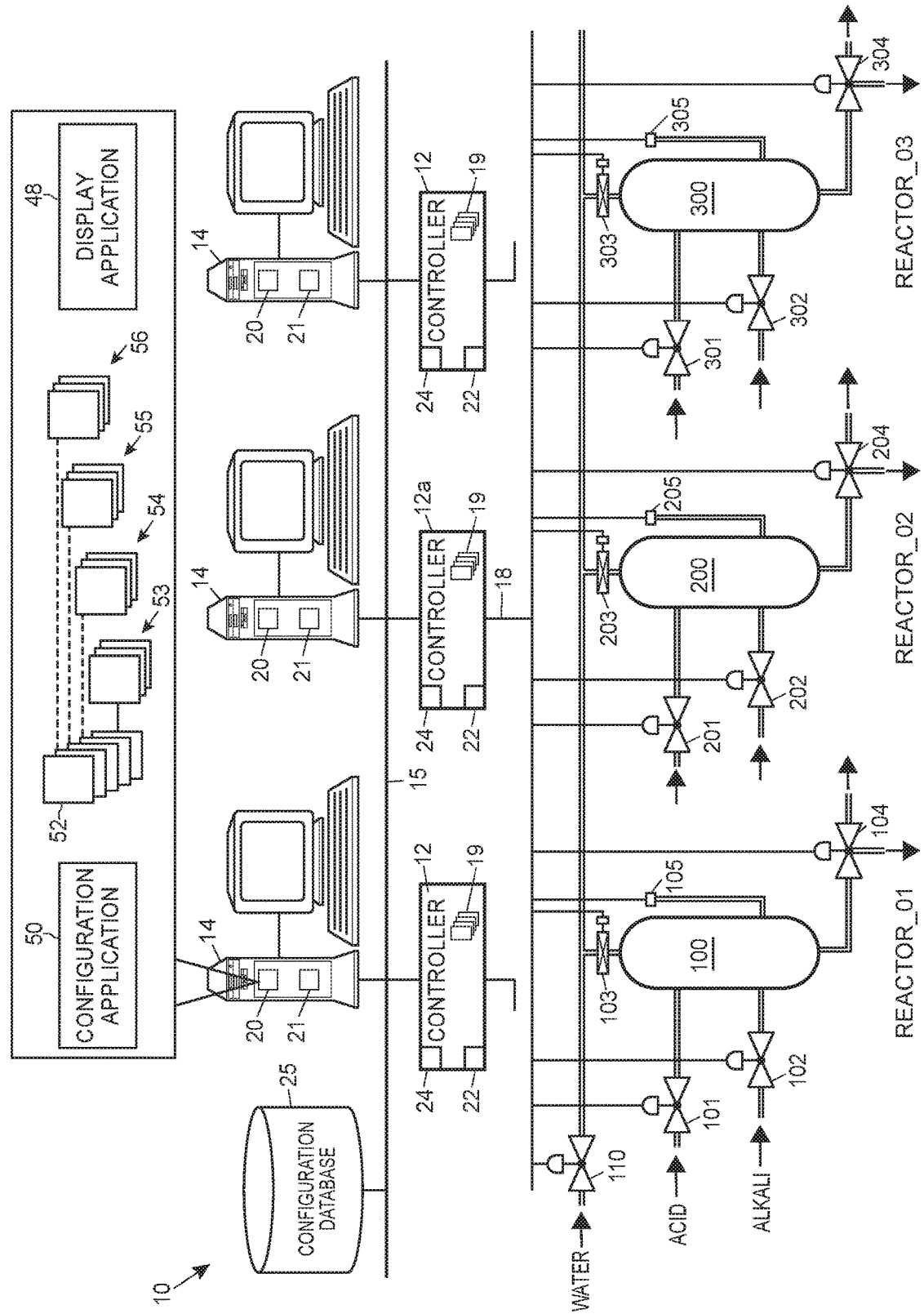
FIG. 1 is a block diagram of an example distributed process control network located within a process plant or process control system, including a workstation that implements a configuration application to configure control and display activities for the process plant or process control system.

Referring now to FIG. 1, a process plant 10 includes one or more process controllers 12 coupled to numerous workstations 14 via, for example, an Ethernet connection or bus 15. The controllers 12 are also coupled to devices or equipment within the process plant 10 via sets of communication lines or buses 18, with only the set of communication lines 18 connected to the controller 12a being illustrated in FIG. 1. The communication lines or buses 18 may be, for example, wired connections, wireless connections, or a combination of wired and wireless connections. The controllers 12, which may be implemented by way of example only using the DeltaV™ controller sold by Fisher-Rosemount Systems, Inc., are capable of communicating with control elements, such as field devices and function blocks within field devices distributed throughout the process plant 10 to perform one or more process control routines 19 to thereby implement desired control of the process plant 10 or of one or more processes operating in the process plant 10. The workstations 14 (which may be, for example, personal computers) may be used by one or more configuration engineers to design the process control routines 19 to be executed by the controllers 12 and display routines to be executed by the workstations 14 or other computers, and to communicate with the controllers 12 so as to download such process control routines 19 to the controllers 12. Furthermore, the workstations 14 may execute display routines that receive and display information pertaining to the process plant 10 or elements thereof during operation of the process plant 10.

Each of the workstations 14 includes a memory 20 for storing applications, such as configuration design applications and display or viewing applications, and for storing data, such as configuration data pertaining to the configuration of the process plant 10. Each of the workstations 14 also includes a processor 21 that executes the applications to enable a configuration engineer to design process control routines and other routines, and to download these process control routines to the controllers 12 or to other computers or to collect and display information to a user during operation of the process plant 10. In some embodiments, a remote computing device is in communicative connection with the workstations 14 (e.g., via a network or web-based interface) so that a configuration engineer may execute applications remotely from the workstations 14.

Still further, each of the controllers 12 includes a memory 22 that stores control and communication applications and a processor 24 that executes the control and communication applications in any known manner. In one case, each of the controllers 12 stores and executes a controller application that implements a control strategy using a number of different, independently executed, control modules or blocks 19. The control modules 19 may each be made up of what are commonly referred to as function blocks wherein each function block is a part or a subroutine of an overall control routine and operates in conjunction with other function blocks (via communications called links) to implement process control loops within the process plant 10, e.g., to control the operation of one or more processes performed by the process plant 10.

As is well known, function blocks, which may be objects in an object oriented programming protocol, typically perform one of an input function, such as that associated with a field device such as a transmitter, a sensor or other process parameter measurement device; a control function, such as that associated with a control routine that performs PID, fuzzy logic, etc. control; or an output function which controls the operation of some device, such as a valve or other field device, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function chart, ladder logic, etc. and are not limited to being designed using function block or any other particular programming technique.

The workstations 14 may provide a graphical depiction of the process control routines 19 within the controllers 12 to a user via a display screen illustrating the control elements within the process control routines 19 and the manner in which these control elements are configured to provide control of the process plant 10. In the system of FIG. 1, a configuration database 25 is connected to the Ethernet bus 15 to store configuration data used by the controllers 12 and the workstations 14 and, in some cases, to serve as a data historian by collecting and storing data generated in the process plant 10 (e.g., process values, events, alarms, or actions taken by operators) for future use. In an embodiment, the configuration database 25 may include library items (e.g., templates and class modules) and system configuration items (e.g., objects created from library items) corresponding to the configuration data. As such, the configuration database 25 may be logically and/or physically partitioned into a library data storage area and a system configuration storage area.

In the process plant 10 illustrated in FIG. 1, the controller 12a is communicatively connected via the bus 18 to three sets of similarly configured reactors (which are replicated equipment within the plant 10) referred to herein as Reactor_01, Reactor_02 and Reactor_03. Reactor_01 includes a reactor vessel or tank 100, three input valve systems (which are equipment entities) 101, 102 and 103 connected so as to control fluid inlet lines providing acid, alkali and water, respectively, into the reactor vessel 100 and an outlet valve system 104 connected so as to control fluid flow out of the reactor vessel 100. A sensor 105, which can be any desired type of sensor, such as a level sensor, a temperature sensor, a pressure sensor, etc., is disposed in or near the reactor vessel 100. For the purpose of this discussion, the sensor 105 is assumed to be a level sensor. Moreover, a shared header valve system 110 is connected on the water line upstream of each of the reactors Reactor_01, Reactor_02 and Reactor_03 to provide a master control for controlling the flow of water to each of those reactors.

Similarly, Reactor_02 includes a reactor vessel 200, three input valve systems 201, 202 and 203, an outlet valve system 204 and a level sensor 205 while Reactor_03 includes a reactor vessel 300, three input valve systems 301, 302 and 303, an outlet valve system 304 and a level sensor 305. In the example of FIG. 1, the reactors Reactor_01, Reactor_02 and Reactor_03 may produce salt with the input valve systems 101, 201 and 301 providing acid, the input valve systems 102, 202 and 302 providing alkali and the input valve systems 103, 203 and 303, in conjunction with the shared water header 110, providing water to the reactor vessel 100. The outlet valve systems 104, 204 and 304 may be operated to send product out of a flow line directed to the right in FIG. 1 and to drain waste or other unwanted material out of a flow line directed to the bottom in FIG. 1.

The controller 12a is communicatively coupled to the valve systems 101-104, 110, 201-204 and 301-304 and to the sensors 105, 205 and 305 via the bus 18 to control the operation of these elements to perform one or more operations with respect to the reactor units, Reactor-01, Reactor_02 and Reactor_03. Such operations, generally called phases, may include, for example, filling the reactor vessels 100, 200, 300, heating the material within the reactor vessels 100, 200, 300, dumping the reactor vessels 100, 200, 300, cleaning the reactor vessels 100, 200, 300, etc.

The valves, sensors and other equipment illustrated in FIG. 1 may be any desired kinds or types of equipment including, for example, Fieldbus devices, standard 4-20 ma devices, HART devices, wireless HART devices, etc. and may communicate with the controller 12 (e.g., any of the controllers 12 or 12a) using any known or desired communication protocol such as the Fieldbus protocol, the HART protocol, a wireless HART protocol or other wireless protocol, the 4-20 ma analog protocol, etc. Generally, devices that are located within the process environment and that perform a function directly impacting the control of the process (e.g., a physical function such as opening or closing valves, a measurement function to be used in a control algorithm or loop, and/or other function) are referred to herein as "field devices."

Still further, other types of devices may be connected to and be controlled by the controllers 12 in accordance with the principles discussed herein. For example, a controller 12 may be connected to one or more input/output (I/O) devices (not shown) which, in turn, may be connected to one or more field devices. An I/O device typically is used by a controller 12 to enable communications between the one or more field devices, the controller 12, and/or the process control system. As such, the I/O device may also be a participant in the direct execution of a control algorithm or loop to control a process. Accordingly, controllers, I/O devices, and field devices are generally and categorically referred to herein as "process control devices." Of course, the term "process control device" is not limited to only controllers, I/O devices and field devices, but may also include other devices that participate in or are required for control algorithms and/or loops to be executed to control a process in a process plant or process control system.

Additionally, other numbers and types of controllers may be connected within the plant 10 to control other devices or areas associated with the process plant 10 and the operation of such additional controllers may be coordinated with the operation of the controller 12a illustrated in FIG. 1 in any desired manner. In some embodiments, the process plant 10 of FIG. 1 includes one or more nodes for wireless communications (not shown) within the process plant 10, such as access points, gateways between wireless and wired networks within the plant 10, gateways to other networks, repeaters, routers, etc. within or external to the plant 10, and the like. These nodes for wireless communications may be communicatively coupled (using a wired protocol, a wireless protocol, or a combination thereof) to controllers 12, workstations 14, the configuration database 25, field devices, other wireless-enabled nodes, and other databases or data storage devices.

Generally speaking, the process plant 10 of FIG. 1 may be used to implement batch processes in which, for example, one of the workstations 14 or the controller 12a executes a batch executive routine, which is a high level control routine that directs the operation of one or more of the reactor units (as well as other equipment) to perform a series of different steps (commonly referred to as phases) needed to produce a product, such as a particular type of salt. To implement different phases, the batch executive routine uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run. Each of the steps defines a phase of the batch run and the batch executive routine within the controller 12a will execute a different control algorithm for each one of these phases. Of course, the specific materials, amounts of materials, heating temperatures, times, etc. may be different for different recipes and, consequently, these parameters may change from batch run to batch run depending on the product being manufactured or produced and the recipe being used. Those skilled in the art will understand that, while control routines and configurations are described herein for batch runs in the reactors illustrated in FIG. 1, control routines may be used to control other desired devices to perform any other desired batch process runs or to perform continuous process runs, if so desired.

As will also be understood, the same phases or steps of a batch process can be implemented on each of the different reactor units of FIG. 1 at the same or at different times. Furthermore, because the reactor units of FIG. 1 generally include the same number of and types of equipment, the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more valves associated with the input valve systems 101, 102 and 103 for a certain amount of time, for example, until the level meter 105 senses that the vessel 100 is full. However, this same control routine may be used to implement a fill phase for Reactor_02 by merely changing the designation of the input valve(s) to be those associated with the valve systems 201, 202 and 203 instead of the valve systems 101, 102 and 103 and by changing the designation of the level meter to be the level meter 205 instead of the level meter 105.

To create and change a process configuration, a configuration application 50 stored in one of the workstations 14 of FIG. 1 includes a set of module class objects 52 for use in configuring the process control plant 10. The module class objects are especially useful when configuring a plant with numerous sets of replicated equipment. Generally speaking, a different module class object 52 can be created for each different type of physical unit or equipment that is replicated or used within the process plant 10, for each type of control activity that is replicated or used within the process plant 10, for each different type of display application that is replicated or used in the process plant 10, etc. Once created, the module class objects 52 can be used to configure elements of the process plant 10 that correspond to module class objects.

The module class objects 52, which are essentially generic versions of process entities and are not tied to any particular process entity, can have lower-level objects or instances 53, 54, 55 and 56 (referred to herein as module objects or module blocks) associated therewith. The term "process entity," as used herein, generally refers to a subset of the process plant 10 or environment that may be integrally identified, categorized or grouped. For example, a process entity may be a physical area of the plant, a type of equipment, a type of control function, a group of related displays, or other category. Process entities may include other process entities. For example, a process entity corresponding to "valves" may include lower level process entities such as "gas valves" or "water valves," and the lower level process entity "water valves" may include still lower level process entities such as "unidirectional water valve" and "bidirectional water valve."

As mentioned above, as used herein, module class objects generally are generic or categorical indications of process entities. A module object 53, 54, 55, 56 may be created or derived from a module class object and thus may inherit the same structure and properties as the module class object from which it was created or derived. However, each module object is tied to a particular entity within the process plant 10. Thus, a single module class object 52 may be created to represent a particular type of reactor unit (no matter how many of those reactor units are present within the plant 10), while a different module object 53 may exist or be created for each of the different reactor units of that type actually present within the plant 10.

The module objects created or derived from a module class object are associated with and owned by the module class object. As a result, changes made to the module class object can be reflected in or propagated to each of the module objects associated with that module class object. Therefore, when a number of module objects have been created from a particular module class object, with each of the different module objects tied to different process entities, a change to the module class object is propagated down to the associated module objects.

The module class objects 52 of FIG. 1 may be what are commonly referred to as objects in an object oriented programming environment or language. As a result, these objects have the ability to own or to refer to other objects. Generally speaking, the module class objects 52 are high level objects which can include indications or definitions of individual elements such as control routines, equipment or other elements associated with a process entity along with a definition or indication of the manner in which those individual elements interact with one another, such as the way in which physical elements are interconnected or the way in which logical elements operate in conjunction with the physical elements. In other words, a module class object may be an object within, for example, an object oriented programming language, that provides the basis for control and viewing of a particular piece of or group of equipment, a control element, a display, etc. within the process plant 10 and may be useful for creating many instances of that element to be used to configure different replicated equipment within the process control plant 10.

Basically, each module class object is a configuration container including a generic definition of a process entity in the form of all of the different control and/or display applications or routines that are applicable to that entity to be used by the controllers 12 to control that entity or by the workstations 14 to perform display activities with respect to that entity. The module class object may represent a process entity of any nature, such as a unit, a piece of equipment, a control entity, a display application, etc. During the configuration of the process plant 10, the module class object may be used to create configuration instances of the process entity for any number of different process entities that conform to the definition provided by the module class object, with each configuration instance (the module object created from the module class object) being associated with or tied to a different actual process entity. These different module objects include, among other things, control routines and/or display routines bound to particular process entities as disposed within the process plant 10, with these control routines being able to be downloaded to and used within the controllers 12 of FIG. 1 to perform actual control activities on the process entities and with the display routines being able to be downloaded at workstations 14 to perform actual display activities with respect to the entities during operation of the process plant 10.

As part of a module class definition, a module class object may indicate or define other module class objects to be incorporated or used therein. When this is the case, the module objects created from that module class object will incorporate, refer to or include other module objects created from other module class objects according to the relationships defined at the module class level. A module object that refers to or is referred to by another module object or a module class object is referred to herein as a "dependent object" or "dependent module object" with respect to the module object or module class object that refers to or is referred to by the module object. Additionally, a module class object that refers to or is referred to by another module class object or a module object is referred to herein as a "dependent object" or "dependent module object" with respect to the module class object or module object that refers to or is referred to by the module class object.

In the configuration of the process plant 10, multiple levels of objects are possible. For example, objects corresponding to instances 53, 54, 55, 56 created from module class objects 52 (e.g., "instance objects") may themselves be parent objects to a set of one or more instance children objects (not shown). One or more of the instance children objects may be a parent object to yet another level of children objects, and so on. As used herein, a "process element object" generally refers to a lowest level of object which corresponds to an elemental process entity to which a configuration is downloaded, such as a valve, sensor, graphic shape, or controller. Thus, a process element object may be an instance object that has no children objects.

In one example, when configuring a process control system, a configuration engineer may create a single module class object for the different elements replicated within the process plant, such as for the different reactors of FIG. 1. Thereafter, the configuration engineer may create instances of the module class object (module objects) for each of the actual reactors of FIG. 1. Each such created module object will include control routines used by the controller 12*a* to operate one of the reactors of FIG. 1 and is specifically tied to or bound to the equipment within the one of the reactors of FIG. 1. These control routines can then be downloaded to the controller 12*a* and used during operation of the process plant 10. However, once created, each of the module objects is still tied to the module class object and can be controlled by the module class object to be changed, to provide or reject access to the module object, etc.

Additionally, the runtime operation for the control routines and display routines may also be modified at a display application 48 stored in one of the workstations 14 of FIG. 1. The display application 48 operates or implements the display routines during runtime to create one or more process displays and may operate or implement the control routines during runtime to provide instructions to the controller 12*a* for controlling the field devices and to receive communications from the controller 12*a*. For example, the display application 48 may operate the display routine to display graphical depictions of process entities within a portion of the process plant and parameter values for parameters corresponding to the process entities. The display application 48 may further operate to provide user controls that enable the operator modify the runtime operation of the process entities. For example, the display application 48 may enable the operator to modify an alarm limit, tuning parameters, interlock limits, etc. In an embodiment, the display application may generate and store an event whenever the user modifies a configuration parameter. The event may indicate a time of change, an indication of the user, a parameter changes, an old value, a new value, and so on. In some embodiments, the control routines, display routines, and/or any other suitable process routines may be downloaded to a combination of the controller 12*a*, the display application 48, the field devices, or any other process element that executes process routines during runtime.

It should be appreciated that modifications to the control routines made by the operator via the display application 48 are not propagated to the configuration database 25. Accordingly, when an operator modifies the runtime environment at the display application 48, a discrepancy exists between the runtime environment for the process entities and the configuration for the process entities.

On the other hand, a configuration engineer may change or modify the configuration of an object, such as a module class object, a module object, etc. via the configuration application 50 of FIG. 1. The configuration application 50 operates to maintain these changes to object configuration at the configuration database 25 and to synchronize the modifications to the object for execution and operation during runtime. However, if, as described above, an operator has modified the runtime operation for a process entity, a discrepancy exists between configuration and runtime parameters. Further, the engineer may not even be aware that this discrepancy exists, particularly in scenarios where the object being modified by the engineer is dependent on the object modified by the operator. When the engineer attempts to save the object configuration changes to the database 25, the configuration application 50 may generate an error or warning. Accordingly, the configuration application 50 may include a user control as shown in FIG. 2 to detect and reconcile any discrepancies.

Figure 2:
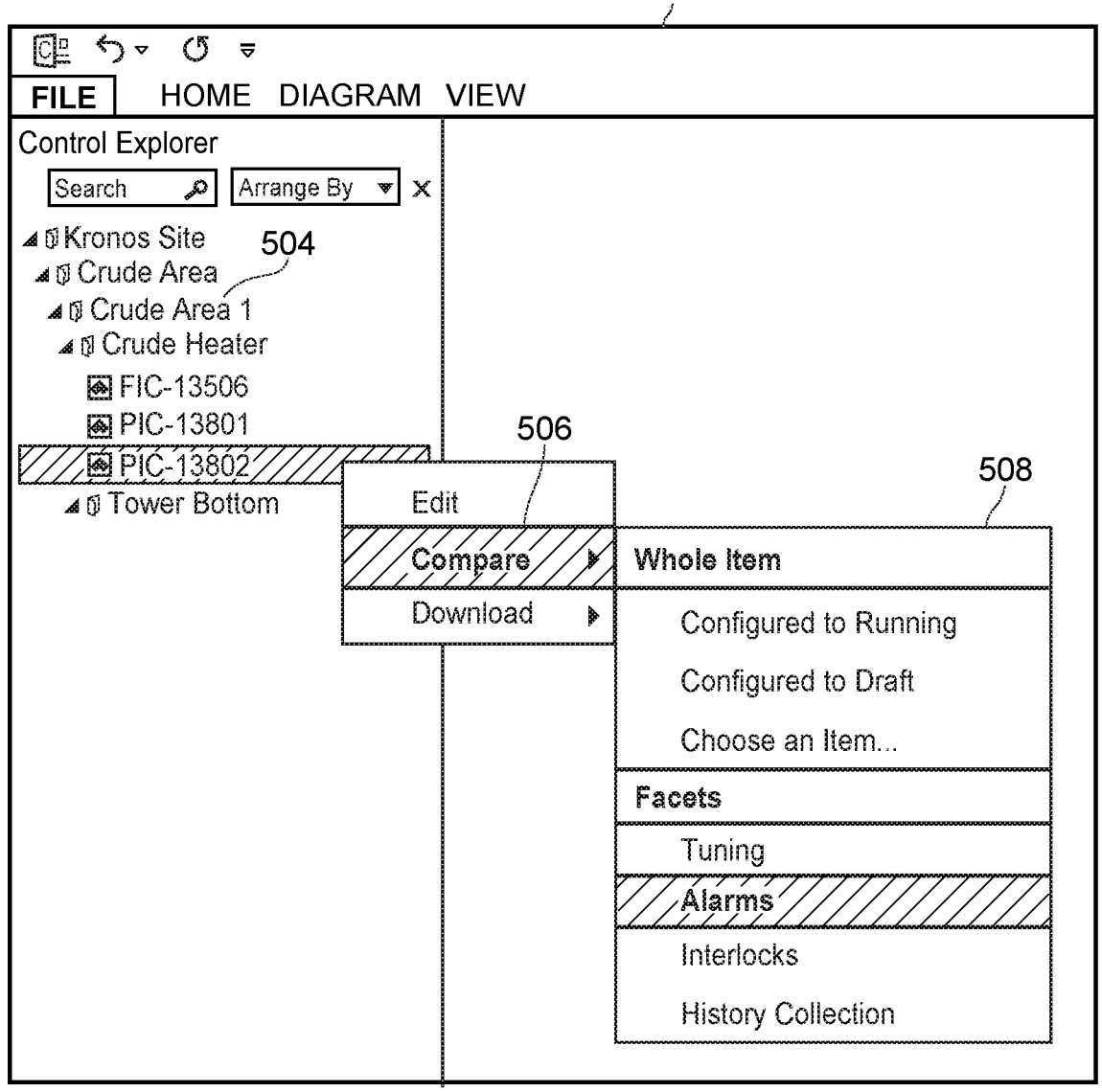
FIG. 2 is an example screen display presented by the configuration application that includes indications of process control modules and a user control for resolving discrepancies.

FIG. 2 illustrates an example screen display 500 presented by the configuration application 50. The example screen display 500 presents a navigable hierarchical list of objects 504 associated with the process plant 10 (or multiple process plants 10). Accordingly, the engineer can navigate the hierarchical list of objects 504 to select one or more objects on which to perform an action, such as, determining whether the one or more objects currently have a discrepancy between a runtime parameter and a configuration parameter. For example, the engineer may select module object PIC-13802 from the hierarchical list 504 as an object on which to perform an action.

Upon receiving a selection of the one or more objects, the example screen display 500 may also include a user control 506 for indicating the desired action. As shown on the example screen display 500, the desired actions may be to edit the selected objects, to compare the parameters for the one or more objects as they exist in different environments, and to download a configuration file for the one or more objects to the workstation 14.

Further, upon receiving a selection to compare the one or more the parameters for the one or more objects, the example screen display 500 may also include a user control 508 for indicating how the configuration application 50 should perform the comparison. As shown in the example screen display 500, the configuration application 50 may enable the engineer to compare the configuration parameters to the runtime (or, as shown in FIG. 2, "running") parameters for the selected one or more object or to the parameters defined in a draft version of the selected one or more objects. Additionally, the user control 508 may enable the engineer to indicate a type of parameter (e.g., a "facet") to compare. As shown in the example display screen 500, the facets can include tuning parameters, alarm parameters, interlock parameters, or history collection parameters.

Upon receiving input via the user control 508, the configuration application 50 may compare the runtime (or draft) parameters having the indicated type to the corresponding configuration parameters for the selected one or more objects. The configuration application 50 may generate and present a discrepancy reconciliation display overlaid on the example screen display 500 with indications of the selected runtime and configuration parameters. For example, the engineer may indicate that the configuration application 50 should compare all of the alarm parameters for the module object PIC-13802.

Figure 3:
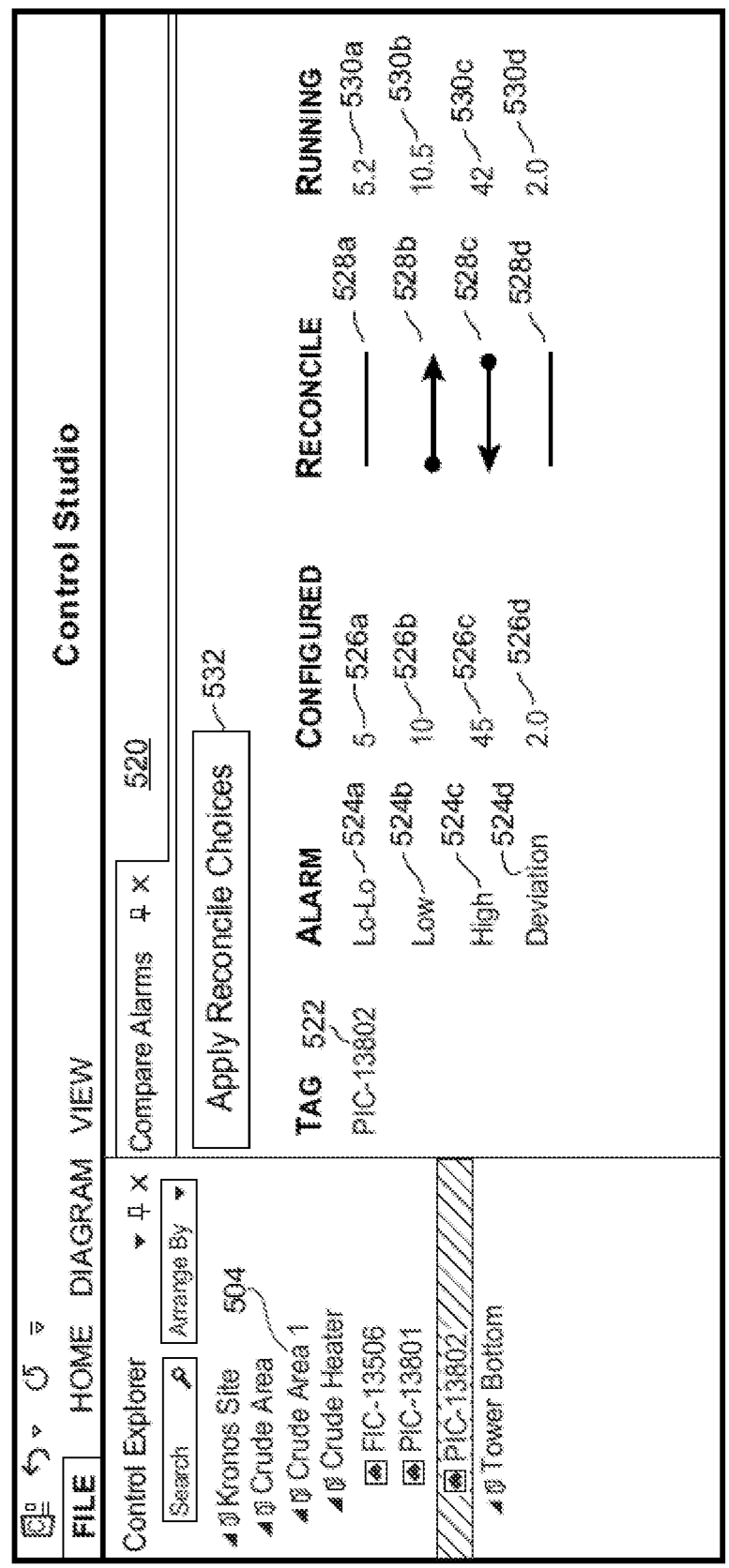
FIG. 3 is an example reconciliation display presented by the configuration application having user controls for providing reconciliation instructions to resolve a discrepancy.

An example discrepancy reconciliation display 520 is illustrated in FIG. 3. The discrepancy reconciliation display 520 may be overlaid on the screen display 500 as shown in FIG. 2 when the engineer indicates how to perform a comparison. For example, the configuration application 50 may create tabs for various displays supported by the configuration application 50. Accordingly, the configuration application 50 may overlay discrepancy reconciliation display 520 on the example screen display 500 by generating a new tab corresponding to the discrepancy reconciliation display 520. The discrepancy reconciliation display 520 may include an indication 522 of the one or more objects for which the configuration application 50 found a discrepancy. While the discrepancy reconciliation display 520 utilizes the tag name for the indication 522, other discrepancy reconciliation displays may utilize other object identifiers such as, a friendly name, a module name, a source path, etc.

For each of the one or more objects, the discrepancy reconciliation display 520 may indicate the parameters matching the instruction on how to conduct the comparison (e.g., all object parameters or just a particular facet). For example, the module object PIC-802 (reference 522) may include alarm parameters associated with a lo-lo alarm limit (reference 524*a*), a low alarm limit (reference 524*b*), a high alarm limit (reference 524*c*), and a deviation alarm limit (reference 524*d*). Of course, the list of parameters indicated by the discrepancy reconciliation display 520 may vary depending on the particular object(s) selected and the facet(s) indicated by the engineer.

Additionally, the discrepancy reconciliation display 520 may include an indication of both the configuration parameter value and the runtime parameter value for each of the object parameters 524. Thus, the engineer can readily detect whether a discrepancy exists between the configuration parameter value and the corresponding runtime parameter value. For example, for the lo-lo alarm limit (reference 524*a*), the PIC-13802 (reference 522) may have a runtime value of 5 (reference 526*a*) and a configuration value of 5.2 (reference 530*a*). Similarly, PIC 13802 (reference 522) may have a low alarm limit (reference 524*b*) having a configuration value of 10 (reference 526*b*) and a runtime value of 10.5 (reference 530*b*), a high alarm limit (reference 524*c*) having a configuration value of 45 (reference 526*c*) and a runtime value of 42 (reference 530*c*), and a deviation alarm limit (reference 524*d*) having a configuration value of 2.0 (reference 526*d*) and a runtime value of 2.0 (reference 530*d*). While the discrepancy reconciliation display 520 includes the deviation alarm limit (reference 524*d*) for the PIC 13802 (reference 522) despite having the same value in both the configuration and runtime, in some alternate displays, parameters having the same runtime and configuration values are not included in the list of parameters 524.

The discrepancy reconciliation display 520 may include selection controls 528*a-d* corresponding to each of the displayed parameters. The selection controls 528*a-d* enable the engineer to provide a reconciliation instruction if a discrepancy is detected. In one scenario, when the engineer clicks on a selection control 528, the selection control 528 cycles between an instruction that reconciles the discrepancy utilizing the runtime value, an instruction that reconciles the discrepancy utilizing the configuration value, and taking no action. For example, an arrow pointing toward the runtime value column (reference 528*b*) may indicate a reconciliation instruction to utilize the runtime value, an arrow pointing toward the configuration value column (reference 528*c*) may indicate a reconciliation instruction to utilize the configuration value, and a straight line (references 528*a* and 528*d*) may be utilized to indicate that no action should be taken.

Additionally, the discrepancy reconciliation display 520 may include an "Apply Reconciliation Choices" button 532 to indicate that the configuration application 50 should update the process control environment in accordance with the reconciliation instructions provided by the selection controls 528a-d. When the engineer selects the button 532, the configuration application 50 transmits indications to one or more process control elements to effect the change indicated by the reconciliation instructions. For example, for a reconciliation instruction indicating that the discrepancy should be resolved utilizing the runtime value (e.g., reference 528b), the configuration application 50 may change the runtime instantiation of the corresponding object. On the other hand, for a reconciliation instruction that indicates that the discrepancy should be resolved utilizing the configuration value (e.g., reference 528c), the configuration application 50 may update the configuration file stored at the configuration database 25 for the corresponding object. In some embodiments, the discrepancy reconciliation display 520 may further include information about an event corresponding to when the operator modified the configuration value to the current runtime value (e.g., an indication of the operator or a time of change).

Although the example display screen 500 illustrates a scenario in which the engineer selects the modules to compare, it should be appreciated that the discrepancy reconciliation display 520 may be presented in response to other actions. For example, the engineer may modify an object utilizing the configuration application 50 (such as by selecting edit from the user control 506). Prior to synchronizing the change, the configuration application 50 may automatically detect whether a discrepancy exists between the configuration parameters and the corresponding runtime parameters for the object and any dependent objects. If a discrepancy exists, the configuration application 50 may generate an error or warning message indicating this discrepancy. This error or warning message may be configured to include a user control that causes the configuration application 50 to generate and present the discrepancy reconciliation display 520 for the object(s) in the same manner as if the engineer had selected the object(s) from the hierarchical list of objects 504.

Figure 4:
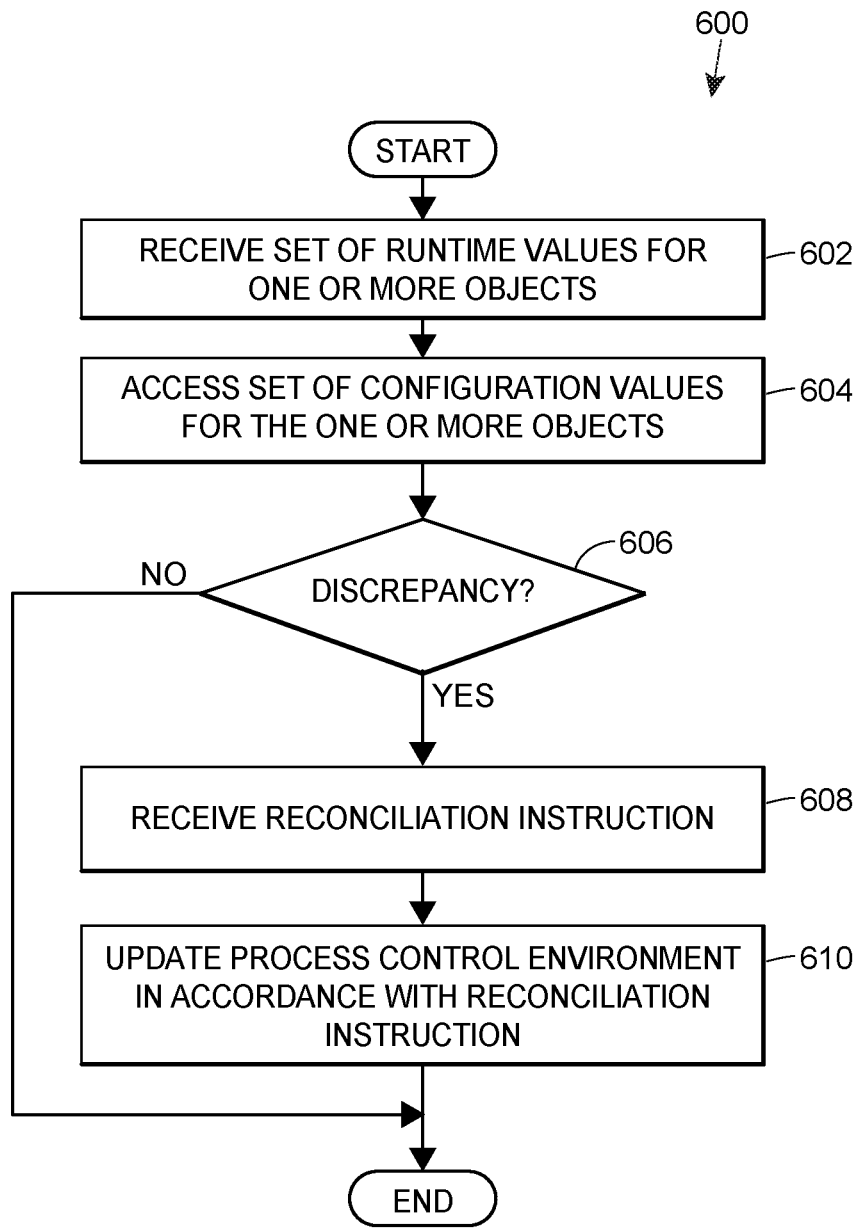
FIG. 4 is a flow diagram of an example method for resolving discrepancies in a process plant.

FIG. 4 depicts a flow diagram of an example method 600 for resolving discrepancies between runtime parameters and configuration parameters in the process plant 10. The method 600 may be executed on the operator workstation 14, server, or any other suitable computing device. In some embodiments, the method 600 may be implemented in the configuration application 50 stored on a non-transitory computer-readable memory and executable on one or more processors of the operator workstation 14, server, or any other suitable computing device.

In one scenario, the configuration application 50 may present a list indicating a plurality of objects associated with the process plant 10 (e.g., the hierarchical list of objects 504). An engineer may interact with the list of objects to provide an indication of one or more objects (and/or a particular facet thereof) for the configuration application 50 to compare runtime and configuration parameter values. In another scenario, an engineer may interact with the configuration application 50 to modify a target object associated with the process control plant 10. Accordingly, the configuration application 50 may determine one or more objects (including the target object) that are impacted by the modification to the target object.

At block 602, the configuration application 50 receives a set of runtime values for one or more objects. The one or more objects may be the objects selected in the list of objects or the objects impacted by the modification to the target object. To receive the set of runtime values, the configuration application 50 may query a data historian or a runtime cache utilizing an identifier of the one or more objects (e.g., tag or friendly name), or send a request to a runtime scanner to provide runtime values to the configuration application 50. In some embodiments, the workstation 14 may function as a data historian. Accordingly, the configuration application 50 may query the runtime data the workstation 14 already received as part of its data historian function.

At block 604, the configuration application 50 may access a set of configuration values for the one or more objects. The configuration values may be stored at the configuration database 25 where the configuration values are included in one or more configuration files corresponding to the one or more objects. In some embodiments, a copy of the configuration files may be stored at the workstation 14, such as when the engineer is modifying the one or more objects. Accordingly, in these embodiments, the local copy of the configuration file may be utilized to access the configuration values.

At decision 606, the configuration application 50 may detect whether a discrepancy exists between a runtime value and a corresponding configuration value for the one or more objects. If no discrepancy exists, the method 600 may terminate. On the other hand, if a discrepancy is detected, the configuration application 50 may generate and present a discrepancy reconciliation display that includes user controls (such as the user controls 528) to provide a reconciliation instruction.

At block 608, the configuration application 50 may receive a reconciliation instruction to resolve the detected discrepancy. In some embodiments, although the engineer may interact with a user control to generate the reconciliation instruction, the reconciliation instruction may not be received until the engineer selects a user control (such as button 532) to apply the reconciliation instruction. In some embodiments, the discrepancy reconciliation display includes user controls to provide reconciliation instructions for multiple parameters. Accordingly, the configuration application 50 can receive a plurality of instructions to reconcile a plurality of discrepancies using a plurality of corresponding reconciliation instructions.

At block 610, the configuration application 50 may update the process control environment in accordance with the reconciliation instruction. When the reconciliation instruction indicates that the configuration value should be utilized to resolve the discrepancy, the configuration application 50 may update a runtime instantiation for the one or more objects to reflect the configuration parameter value. On the other hand, when the reconciliation instruction indicates that the runtime value should be utilized to resolve the discrepancy, the configuration application 50 may modify the configuration files for the one or more objects stored in the configuration database 25 to reflect the runtime value.

It should be appreciated that one or more of the discrepancy resolution techniques described herein may be used in a process plant, such as the process plant 10 of FIG. 1, or in other suitable process plants or process control systems. In an example, one or more of the techniques described herein is performed by a configuration application 50 executed on one or more workstations 14 of FIG. 1. In another example, one or more of the techniques described herein is performed at least partially by a remote application (e.g., a web client or other remote access means) that accesses the application. In some embodiments, one or more of the discrepancy reconciliation techniques are used in combination with other discrepancy reconciliation techniques other than those described herein.

Instantiation:

Objects may be selected for instantiation by a user, in an embodiment. Instantiation of selected objects results in a corresponding process element executing, during runtime, according to the internal items defined by the selected objects. For example, in the case of a control object, a user desires a particular modified configuration of the control object to be downloaded to a corresponding device in the runtime system. The user instructs the system to generate a download configuration from the selected configuration, and to transmit the download configuration to the process element in the runtime system. As such, during runtime, the process element executes an executing configuration of the control object, where the executing configuration includes the modifications to the control object. In another example, a user instructs the configuration system to instantiate a graphic display element object included on a display view. The configuration system creates an executing configuration of the graphic display element object. When the corresponding display view is built at runtime, the executing configuration of the graphic display object is executed, resulting in a respective graphic element being included on the display view. When multiple configurations are available, a user may select which of the multiple configurations is to be instantiated.

Embodiments of the techniques described in the present disclosure may include any number of the following aspects, either alone or combination:

What is claimed is:

1. A computing device for reconciling process control discrepancies in a process plant, the computing device comprising: one or more processors; and a non-transitory computer-readable medium coupled to the one or more processors and storing a configuration application thereon, that when executed by the one or more processors, causes the computing device to: receive a set of runtime values for one or more objects corresponding to one or more process entities, the one or more objects corresponding to respective sets of object parameters; access a set of configuration values for the one or more objects corresponding to the one or more process entities; detect a discrepancy between a runtime value and a configuration value for a particular object parameter within the set of object parameters corresponding to a particular object; receive a reconciliation instruction; and update a process control environment in accordance with the reconciliation instruction.

2. The computing device according to aspect 1, wherein the configuration application further causes the computing device to: present a list of a plurality of objects associated with the process plant; and receive an indication of the one or more objects.

3. The computing device according to any one of the preceding aspects, wherein to receive the reconciliation instruction, the configuration application further causes the computing device to: receive, via a user interface, the reconciliation instruction, wherein the reconciliation instruction indicates that the runtime value should be used to reconcile the discrepancy.

4. The computing device according to any one of the preceding aspects, wherein to update the process control environment, the configuration application further causes the computing device to: update a configuration file corresponding to the particular object to configure the particular object parameter to be the runtime value.

5. The computing device according to any one of the preceding aspects, wherein to receive the reconciliation instruction, the configuration application further causes the computing device to: receive, via a user interface, the reconciliation instruction, wherein the reconciliation instruction indicates that the configuration value should be used to reconcile the discrepancy.

6. The computing device according to any one of the preceding aspects, wherein to update the process control environment, the configuration application further causes the computing device to: update a runtime instantiation of the particular object to change the particular object parameter to the configuration value.

7. The computing device according to any one of the preceding aspects, wherein the configuration application further causes the computing device to: receive an indication that a user is modifying a target object associated with the process control plant, wherein the one or more objects include objects impacted by the modification to the target object.

8. The computing device according to any one of the preceding aspects, wherein the configuration application further causes the computing device to: present an interface that indicates a plurality of discrepancies between the set of runtime values and the set of configuration values.

9. The computing device according to any one of the preceding aspects, wherein the configuration application further causes the computing device to: receive, via the interface, a plurality of reconciliation instructions for one or more of the plurality of discrepancies; and update the process control environment in accordance with the plurality of reconciliation instructions.

10. The computing device according to any one of the preceding aspects, wherein the runtime value corresponds to an indication of a person that modified the configuration value.

11. A method of reconciling process control discrepancies in a process plant, the method comprising: receiving, by one or more processors executing a configuration application, a set of runtime values for one or more objects corresponding to one or more process entities, the one or more objects corresponding to respective sets of object parameters; accessing, by the one or more processors, a set of configuration values for the one or more objects corresponding to the one or more process entities; detecting, by the one or more processors, a discrepancy between a runtime value and a configuration value for a particular object parameter within the set of object parameters corresponding to a particular object; receiving, by the one or more processors, a reconciliation instruction; and updating, by the one or more processors, a process control environment in accordance with the reconciliation instruction.

12. The method according to aspect 11, further comprising: presenting, by the one or more processors, a list of a plurality of objects associated with the process plant; and receiving, by the one or more processors, an indication of the one or more objects.

13. The method according to any one of aspect 11-12, wherein receiving the reconciliation instruction further comprises: receiving, via a user interface presented by the one or more processors, the reconciliation instruction, wherein the reconciliation instruction indicates that the runtime value should be used to reconcile the discrepancy.

14. The method according to any one of aspect 11-13, wherein updating the process control environment further comprises: updating, by the one or more processors, a configuration file corresponding to the particular object to configure the particular object parameter to be the runtime value.

15. The method according to any one of aspect 11-14, wherein receiving the reconciliation instruction further comprises: receiving, via a user interface presented by the one or more processors, the reconciliation instruction, wherein the reconciliation instruction indicates that the configuration value should be used to reconcile the discrepancy.

16. The method according to any one of aspect 11-15, wherein updating the process control environment further comprises: updating, by the one or more processors, a runtime instantiation of the particular object to change the particular object parameter to the configuration value.

17. The method according to any one of aspect 11-16, further comprising: receiving, by the one or more processors, an indication that a user is modifying a target object associated with the process control plant, wherein the one or more objects include objects impacted by the modification to the target object.

18. The method according to any one of aspect 11-17, further comprising: presenting, by the one or more processors, an interface that indicates a plurality of discrepancies between the set of runtime values and the set of configuration values.

19. The method according to any one of aspect 11-18, further comprising: receiving, via the interface, a plurality of reconciliation instructions for one or more of the plurality of discrepancies; and updating, by the one or more processors, the process control environment in accordance with the plurality of reconciliation instructions.

20. A non-transitory computer-readable storage medium storing instructions operable, when executed by one or more processors executing a configuration application, to cause the configuration application to execute a method, the method comprising: receiving, by one or more processors, a set of runtime values for one or more objects corresponding to one or more process entities, the one or more objects corresponding to respective sets of object parameters; accessing, by the one or more processors, a set of configuration values for the one or more objects corresponding to the one or more process entities; detecting, by the one or more processors, a discrepancy between a runtime value and a configuration value for a particular object parameter within the set of object parameters corresponding to a particular object; receiving, by the one or more processors, a reconciliation instruction; and updating, by the one or more processors, a process control environment in accordance with the reconciliation instruction.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device), such as illustrated in FIG. 1. The instructions, when executed by one or more processors of a corresponding device (e.g., a server, an operator workstation, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," "engineer," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A computing device for reconciling process control discrepancies in a process plant, the computing device comprising:
   one or more processors; and
   a non-transitory computer-readable medium coupled to the one or more processors and storing a configuration application thereon, that when executed by the one or more processors, causes the computing device to:
      receive a set of runtime values for one or more objects corresponding to one or more process entities, the one or more objects corresponding to respective sets of object parameters;
      access a set of configuration values for the one or more objects corresponding to the one or more process entities;
      detect a request to synchronize a modification of a particular object of the one or more objects;
      in response to detecting the request to synchronize the modification, for object parameters associated with the particular object and prior to synchronizing the modification, detect a discrepancy between a runtime value and a configuration value for a particular object parameter within the set of object parameters corresponding to the particular object;
      in response to detecting the discrepancy, present a message that indicates that a discrepancy exists, wherein the message is configured to include a user control that causes the computing device to present a discrepancy resolution display screen;
      receive, via the discrepancy resolution display screen, two or more reconciliation instructions corresponding to two or more object parameters within the set of object parameters, wherein (i) a first reconciliation instruction of the two or more reconciliation instructions indicates that the configuration value should be used to reconcile the discrepancy for a first object parameter of the two or more object parameters, and (ii) a second reconciliation instructions of the two or more reconciliation instructions indicates that the runtime value should be used to reconcile the discrepancy for a second object parameter of the two or more object parameters; and
      in response to an interaction with the user interface, update a process control environment in accordance with the two or more reconciliation instructions.

2. The computing device of claim 1, wherein the configuration application further causes the computing device to:
   present a list of a plurality of objects associated with the process plant; and
   receive an indication of the one or more objects.

3. The computing device of claim 1, wherein to update the process control environment in accordance with the second reconciliation instruction, the configuration application further causes the computing device to:
   update a configuration file corresponding to the particular object to configure the second object parameter to be the runtime value.

4. The computing device of claim 1, wherein to update the process control environment in accordance with the first reconciliation instruction, the configuration application further causes the computing device to:
   update a runtime instantiation of the particular object to change the first object parameter to the configuration value.

5. The computing device of claim 1, wherein the configuration application further causes the computing device to:
   receive an indication that a user is modifying a target object associated with the process control plant, wherein the one or more objects include objects impacted by the modification to the target object.

6. The computing device of claim 1, wherein the configuration application further causes the computing device to:
   present an interface that indicates a plurality of discrepancies between the set of runtime values and the set of configuration values.

7. The computing device of claim 1, wherein the runtime value corresponds to an indication of a person that modified the configuration value.

8. A method of reconciling process control discrepancies in a process plant, the method comprising:
   receiving, by one or more processors executing a configuration application, a set of runtime values for one or more objects corresponding to one or more process entities, the one or more objects corresponding to respective sets of object parameters;
   accessing, by the one or more processors, a set of configuration values for the one or more objects corresponding to the one or more process entities;
   detecting, by the one or more processors, a request to synchronize a modification of a particular object of the one or more objects;
   in response to detecting the request to synchronize the modification, for object parameters associated with the particular object and prior to synchronizing the modification, detecting, by the one or more processors, a discrepancy between a runtime value and a configuration value for a particular object parameter within the set of object parameters corresponding to a particular object;
   in response to detecting the discrepancy, presenting, by the one or more processors, a message that indicates that a discrepancy exists, wherein the message is configured to include a user control that causes the computing device to present a discrepancy resolution display screen;
   receiving, by the one or more processors and via the discrepancy resolution display screen, two or more reconciliation instructions corresponding to two or more object parameters within the set of object parameters, wherein (i) a first reconciliation instruction of the two or more reconciliation instructions indicates that the configuration value should be used to reconcile the discrepancy for a first object parameter of the two or more object parameters, and (ii) a second reconciliation instruction of the two or more reconciliation instructions indicates that the runtime value should be used to reconcile the discrepancy for a second object parameter of the two or more object parameters; and in response to an interaction with the user interface, updating, by the one or more processors, a process control environment in accordance with the two or more reconciliation instructions.

9. The method of claim 8, further comprising:

presenting, by the one or more processors, a list of a plurality of objects associated with the process plant; and receiving, by the one or more processors, an indication of the one or more objects.

10. The method of claim 8, wherein updating the process control environment in accordance with the second reconciliation instruction further comprises:

updating, by the one or more processors, a configuration file corresponding to the particular object to configure the second object parameter to be the runtime value.

11. The method of claim 8, wherein updating the process control environment in accordance with the first reconciliation instruction further comprises:

updating, by the one or more processors, a runtime instantiation of the particular object to change the first object parameter to the configuration value.

12. The method of claim 8, further comprising:

receiving, by the one or more processors, an indication that a user is modifying a target object associated with the process control plant, wherein the one or more objects include objects impacted by the modification to the target object.

13. The method of claim 8, further comprising:

presenting, by the one or more processors, an interface that indicates a plurality of discrepancies between the set of runtime values and the set of configuration values.

14. The method of claim 13, further comprising:

receiving, via the interface, a plurality of reconciliation instructions for one or more of the plurality of discrepancies; and updating, by the one or more processors, the process control environment in accordance with the plurality of reconciliation instructions.

15. A non-transitory computer-readable storage medium storing instructions operable, when executed by one or more processors executing a configuration application, to cause the configuration application to execute a method, the method comprising:

receiving, by one or more processors, a set of runtime values for one or more objects corresponding to one or more process entities, the one or more objects corresponding to respective sets of object parameters;

accessing, by the one or more processors, a set of configuration values for the one or more objects corresponding to the one or more process entities;

detecting, by the one or more processors, a request to synchronize a modification of a particular object of the one or more objects;

in response to detecting the request to synchronize the modification, for object parameters associated with the particular object and prior to synchronizing the modification, detecting, by the one or more processors, a discrepancy between a runtime value and a configuration value for a particular object parameter within the set of object parameters corresponding to a particular object;

in response to detecting the discrepancy, presenting, by the one or more processors, a message that indicates that a discrepancy exists, wherein the message is configured to include a user control that causes the computing device to present a discrepancy resolution display screen;

receiving, by the one or more processors and via the discrepancy resolution display screen, two or more reconciliation instructions corresponding to two or more object parameters within the set of object parameters, wherein (i) a first reconciliation instruction of the two or more reconciliation instructions indicates that the configuration value should be used to reconcile the discrepancy for a first object parameter of the two or more object parameters, and (ii) a second reconciliation instruction of the two or more reconciliation instructions indicates that the runtime value should be used to reconcile the discrepancy for a second object parameter of the two or more object parameters; and in response to an interaction with the user interface, updating, by the one or more processors, a process control environment in accordance with the two or more reconciliation instructions.

* * * * *